Oct. 31, 1967  E. SNITZER  3,350,654
LASER HETERODYNE SYSTEM FOR DETECTING LIGHT ENERGY INCLUDING
HYBRID MODE DIELECTRIC WAVEGUIDE
Filed Jan. 9, 1964
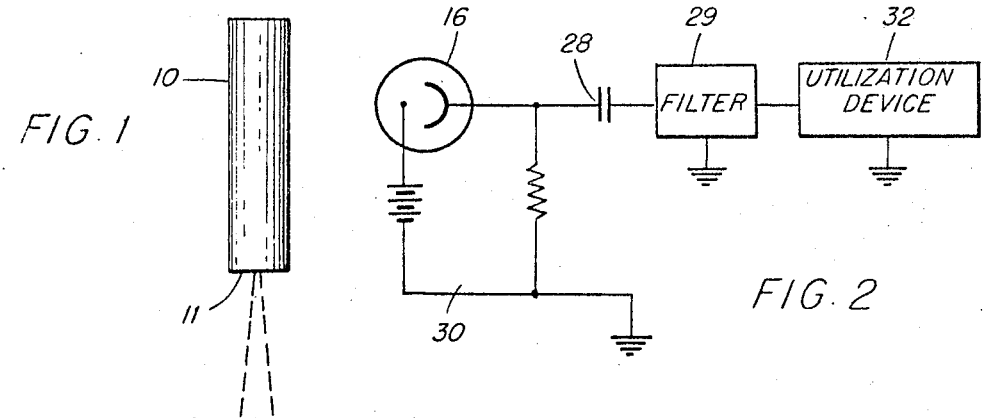
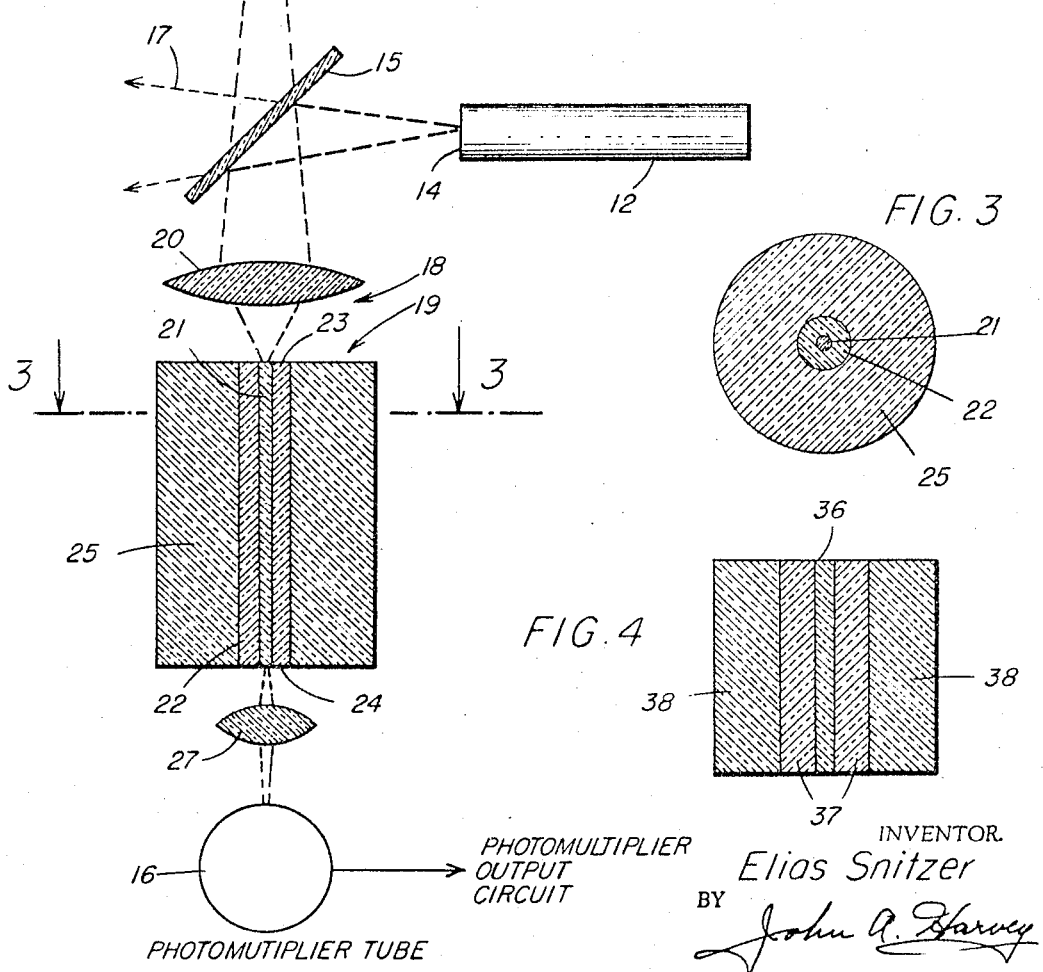
INVENTOR.
Elias Snitzer
BY John A. Harvey
ATTORNEY 3,350,654
LASER HETERODYNE SYSTEM FOR DETECTING LIGHT ENERGY INCLUDING HYBRID MODE DIELECTRIC WAVEGUIDE
Elias Snitzer, Sturbridge, Mass., assignor to American Optical Company, Southbridge, Mass., a voluntary association of Massachusetts
Filed Jan. 9, 1964, Ser. No. 336,782
12 Claims. (Cl. 329—144)

This invention relates to optical systems for detecting light energy, and in a specific sense is particularly directed to optical heterodyne systems for detecting coherent light energy emitted by a laser.

Laser devices typically provide a coherent monochromatic light output of very high intensity and narrow beam spread. The detection of laser light through a detection system having a frequency bandpass comparable to the line width of the light may often be desirable in attaining efficient spectrum utilization and a maximum light energy-to-noise ratio. By way of example, laser communications systems have been proposed wherein laser light is modulated to serve as the carrier signal of modulation intelligence and maximum system sensitivity dictates a maximized signal to noise ratio.

Most conventional forms of narrow bandpass filter arrangements heretofore proposed are inadequate to provide for laser light a sufficiently narrow passband characteristic or have other undesirable limitations and disadvantages. Thus, for example, interference filters have a bandpass far wider than the laser line width for reasonable peak transmission. A suitably narrow bandpass is attainable in a Fabry-Perot interferometer having wide spacing between the plates, but such interferometer will ordinarily pass a large number of frequencies at which the distance between the interferometer plates is an integral multiple of the corresponding half-wavelength value.

It has accordingly been proposed, as an alternative approach to the detection of the narrow band laser signal, to employ an optical form of electromagnetic heterodyne system. One such system is described in a paper by A. T. Forrester entitled, "Photodetection and Photomixing of Laser Outputs," presented at the Second Quantum Electronics Conference in Berkeley, Calif., in March 1961. This system employs as a heterodyne mixer a photomultiplier tube which exhibits a square-law response to the electric field of incident light. Incoming laser light to be detected is supplied to the photomultiplier tube together with light energy from a second laser light source which serves as a local oscillator for the system and has a frequency different from that of the first laser light energy. The electrical energy output of the photomultiplier contains a frequency component corresponding to the difference of the frequencies of the two input light energies and theoretically also contains a frequency component corresponding to the sum of the two frequencies. By employing as a local oscillator a laser having an output frequency which differs from the frequency of the incoming light energy by a sufficiently small amount, the difference frequency can be brought within the radio or microwave frequently range, and can thus be demodulated and amplified or otherwise detected by conventional radio or microwave frequency devices having a suitably narrow passband to attain high signal to noise ratio.

A substantial difficulty in providing a practical embodiment of such a heterodyne system inheres in the requirement that to obtain a difference-frequency output, the incoming light and that from the local oscillator must be so oriented that the plane wavefronts of the two light energies as they impinge on the photomultiplier tube are very nearly exactly parallel to one another. Even a small deviation from parallelism between the wavefronts creates undesirable interference in that the photomultiplier tube averages over the beat frequency and the difference frequency is lost. This requirement may be further explained by considering a plane wave as a free space mode. A given free space mode is characterized by a direction of polarization and a direction of propagation of the parallel wavefronts. Thus, the use of the heterodyne system requires that the incoming and local oscillator light energies be supplied to the photomultiplier tube in the same or very nearly the same free space mode.

It is an object of the present invention to provide a new and improved optical light-detecting system which ensures that light energies supplied by two or more individual light sources shall be propagated through a common light propagation path with mutually parallel wavefronts.

Another object is to provide an optical coherent-light-detecting system of a type which enables heterodyne operation to be readily accomplished in a new and improved manner which avoids one or more of the disadvantages and limitations of prior such systems.

Further objects and advantages of the invention will be apparent from the detailed description hereinbelow set forth, together with the accompanying drawing, wherein:

FIG. 1 is a schematic view of an optical coherent-light-detecting system embodying the invention in a particular form;

FIG. 2 is a diagrammatic view illustrating in simplified form a typical output circuit for the photomultiplier tube of the system of FIG. 1;

FIG. 3 is a sectional view taken along the plane 3—3 of FIG. 1; and

FIG. 4 is a view of an alternative waveguide structure for use in the system of FIG. 1, taken as along the plane 3—3 of FIG. 1.

The system shown in FIG. 1 is an optical coherent-light-detecting system embodying the present invention in a form which, by way of example, enables light energies from two sources to be combined and a difference frequency energy derived therefrom. In particular, the optical system there illustrated is shown as one arranged for detection of an optical energy signal constituted by a beam of laser output light energy emitted by a first laser, represented generally at 10. The system of FIG. 1 is specifically adapted to operate as an optical heterodyne system producing radio frequency or microwave frequency output energy (for detection and utilization as desired) from the incoming signal from the laser 10 and in a specific sense to provide detection of the coherent light energy from the laser 10 affording preservation of intensity of selected frequency components of the laser light energy for analysis or measurement of these components individually or collectively.

The system of FIG. 1 may be used to detect the output light energy of various types of lasers producing a coherent monochromatic optical-energy output (it being understood that the terms "light" and "optical energy" as used herein refer to electromagnetic energy extending over the approximate band of frequencies from infrared to ultraviolet or beyond). For purposes of illustration, reference will be made herein to a signal-source laser 10 comprising a gas laser adapted to produce a continuous light output. Thus, by way of example, the gas laser 10 may be a helium-neon laser (in which the laserable material is a mixture of helium and neon in gaseous state) adapted to emit through an end face 11 a continuous output beam of coherent, monochromatic light at, for example, a wavelength of approximately 6300 Angstroms.

The structure and operation of lasers of this type is well known to those skilled in the art, and accordingly need not be described in detail. In general, it may be explained that light is produced in a gas laser by emission from excited atoms of a confined body of gas, occurring incident to the transition of the atoms from an upper energy level to a lower energy level. The requisite upper-level atomic population is maintained by a gas electrical discharge in the case of a helium-neon laser. The laser structure is so designed that, with such continuous pumping, there is emitted (as through the end face 11 of the laser 10 in FIG. 1) a continuous output of coherent, monochromatic light.

The local oscillator of the heterodyne system of FIG. 1 is a second laser represented generally at 12, such as a gas laser functioning in the manner described above to produce a continuous output beam of coherent, monochromatic light energy. The laser 12 is selected to provide output light energy of a frequency wich differs from the frequency of the incoming signal from the laser 10 by an amount equal to a microwave or radio frequency so as to enable attainment of the desired heterodyne effect. Thus, for detection of the aforementioned 6300 Angstrom signal, a suitable local oscillator is a second helium-neon laser adapted to produce a continuous coherent output beam in the same neon line. This local oscillator laser is operated to provide a continuous output during the operation of the device of FIG. 1 to detect a continuous incoming signal from the laser 10.

The laser 12 is so disposed that its output beam intersects the incoming signal beam from the laser 10 in a direction or path of propagation of the incoming beam to-intersection, a beam-splitter plate 15 comprising a partially silvered planar glass surface is positioned (at a 45° angle to the axis of each of the two beams) to reflect a portion of the light beam from the laser 12 along the direction or path of propagation of the incoming beam toward a photomultiplier tube 16 (which constitutes the mixing or nonlinear element of the heterodyne arrangement and will be described in further detail below). The beam-splitter also transmits a portion of the incoming-signal light from the laser 10 in the same direction, that is, toward the tube 16. Other portions of the beams from the lasers 10 and 12 are respectively reflected and transmitted by the beam splitter in the general direction indicated at 17 (the initial direction of propagation of the beam from the laser 12).

The light passing from the beam splitter toward the photomultiplier tube 16 thus includes light from both the signal-source laser 10 and the local oscillator laser 12. Conceivably with ideal positioning of the laser 12 and the beam splitter 15 relative to each other and to the laser 10, the beams of light from the two sources as thus directed by the beam splitter will be aligned along a single light propagation path with their respective wavefronts exactly parallel to each other, the requisite condition for satisfactory optical heterodyne operation. However, the precise positioning of elements necessary to achieve this result is very difficult to establish and maintain; and even a slight deviation from such precise positioning results in a deleterious misalignment of the two beams with resultant failure to preserve the amplitudes of the frequency components appearing in the desired beat-frequency energy developed by the tube 16.

Accordingly, as a particular feature of the invention, the system of FIG. 1 further includes a particular form of light-energy propagation-mode-responsive aligning structure, indicated generally at 18, interposed in the path of the light intermediate the beam splitter 15 and photomultiplier 16. This structure includes an optical waveguide 19 (described in further detail below) and a light-energy concentrating lens system diagrammatically represented at 20 and comprising a reversed optical microscope objective preferably corrected for infinity (a so-called "infiinity corrected" objective).

Referring more particularly to the waveguide 19, this element is shown in FIGS. 1 and 3 as comprising a clad optical fiber including an elongated and smooth-sided core 21 fabricated of a first light-transmissive material having a first index of refraction and laterally surrounded by a cladding 22 of a second light-transmissive material having a second lesser index of refraction. The opposite ends of this clad fiber are polished to provide plane surfaces 23, 24 perpendicular to the long axis of the core. A second cladding 25 of light-energy absorbing or opaque (black) glass, preferably having an index of refraction higher than that of the cladding material 22, surrounds the inner cladding 22 to act as a light absorber and shield.

The fiber core 21 is coaxially aligned at least approximately with the axis of the path of light passing from the beam splitter 15 toward the photomultiplier 16, so that the light can reach the photomultiplier from the beam splitter only by passing through the fiber. This light advancing from the beam splitter 15 (including the light from both lasers 10 and 12) is focused by the lens system 20 onto the proximate end of the fiber core 21 for propagation therethrough. As will now be explained, the fiber acts as a mode selector to assure that the light outputs of both lasers 10 and 12 are incident on the photomultiplier in the same mode with their wavefronts parallel.

It will be appreciated that the transmissive core of a clad optical fiber provides an elongated light-propagation path having a transverse dimension small with respect to its length. The boundary of this propagation path is established at the side surface of the core, which being clad with a material having a refractive index lower than that of the core provides a condition of so-called total internal reflection at the core-cladding interface.

If the diameter of the core is comparable in magnitude to the wavelength of light entering an end of the core, the clad fiber exhibits the properties of a dielectric waveguide. The modes in which light can propagate through the core are related to the waveguide parameters (specifically the core diameter), the core boundary conditions established by the ratio between the refractive indices of the cladding and core, and the wavelength of the light. In particular, each given mode of higher order than the lowest order mode (which is commonly designated the $HE_{11}$ mode) is said to have a cut-off frequency above which propagation in the given mode is supported and below which propagation is severly attenuated. This means that light energy of a particular frequency can propagate through the core in a given mode (other than the $HE_{11}$ mode) only if the reciprocal of its wavelength is above the cut-off value for that mode; and conversely, for any given light component wavelength there exists a core diameter at which the reciprocal of such wavelength is below the cut-off value of every mode except the $HE_{11}$ mode.

In the present system, the fiber comprising the core 21 and cladding 22 has waveguide parameters and core boundary conditions selected to support propagation in at least one wave-energy propagation mode for light or both the incoming and local signal frequencies, thereby to establish portions of both light energies in at least one common mode. Preferably the fiber is so designed (in accordance with the foregoing principles) that the core will support propagation only in the $HE_{11}$ mode (which has no cut-off) for light of the wavelengths emitted by the respective lasers 10 and 12, and will substantially attenuate light in all other modes. By way of example, for laser outputs of the previously specified wavelengths, a fiber having a core diameter of 2 microns and core and cladding refractive indices respectively equal to 1.54 and 1.52 possesses the desired mode-selective property. With such a fiber, only that portion of the incident light energy from the lasers 10 and 12 (focused by the lens 20 onto the fiber end 23) which enters the fiber core in the $HE_{11}$ mode will propagate through the core 21 and emerge from the far end 24. All other light will be severely and rapidly attenuated along the length of the fiber or (as in the case of light entering the fiber at a sufficiently large angle of incidence, for which light the core-cladding interface does not have total internal reflection but transmits the light out of the core through the cladding) prevented from reaching the photomultiplier by absorption in the outer cladding 25.

Consequently, the clad fiber core 21 has a mode-selective effect with the result that all the light emerging from the fiber end 24 (comprising portions of both the incoming light from the laser 10 and the local oscillator light from the laser 12) is comprised by light propagating in a single mode. Since all plane wavefronts of light in a single mode are parallel, the portions of the two light energies emerging from the fiber are effectively aligned with their wavefronts in exactly parallel relation to each other, as necessary for optimum heterodyne operation. In other words, even if the beam splitter 15 and laser 12 are not precisely positioned for exact alignment of the directional axes of propagation of the incoming signal beam and the local oscillator beam, all the light passing beyond the core 21 to the photomultiplier 16 is properly aligned, because the core effectively transmits only the aligned portions of the two beams.

The aligned, single-mode light emerging from the fiber core 21 is further propagated (for example, through a second lens or lens system 27) to the photomultiplier tube 16, which is so positioned that the light impinges on the photosensitive surface of the tube at a normal direction of incidence. For operation as the mixer in the heterodyne process, the photomultiplier 16 is selected for sensitivity to light in the wavelengths emitted by the lasers 10 and 12 and as earlier mentioned exhibits a non-linear (square law) response to this incident light. Conventional types of photomultiplier tubes are suitable for this purpose, one example (appropriate for use with the exemplary wavelengths mentioned above) being the tube commercially available from the Radio Corporation of America under the designation RCA 7102 embodying a conventionally designated "S1" photoemissive surface.

Because of its non-linear character, the photomultiplier 16 responds to the incident beams of aligned light from the two lasers 10 and 12 by producing an electrical energy output which includes a frequency component equal to the difference of the respective frequencies of the incoming light from the laser 10 and the local oscillator light of the laser 12, and also theoretically includes a frequency component equal to the sum of the two frequencies. The output circuitry of the photomultplier tube is shown in simplified diagrammatic form in FIG. 2 (it being understood that the tube 16, while represented for simplicity in FIG. 2 as a photoelectric cell, is actually a photomultiplier tube for increased sensitivity). This circuitry includes a coupling capacitor 28 and a filter 29. The coupling capacitor serves to isolate the filter input circuit from the unidirectional voltage of the photomultiplier tube power supply circuit 30. The filter, which may be a conventional form of microwave receiver (assuming that the difference-frequency component of the photomultiplier output is of microwave frequency) having its input circuit tuned to the difference-frequency component of the photomultiplier output, filters out all other frequency components of the latter output and selectively transmits the difference-frequency component (for amplification, demodulation, or other utilization as desired) to further circuitry represented generally as a utilization device 32. In this way, the system of FIG. 1 functions as a heterodyne system to produce a radio frequency or microwave frequency output from the filter 29 having an amplitude proportional to the intensity of the incident light of the incoming signal beam from the laser 10.

Various modifications of the foregoing system are possible. Thus, for example, while as described above and indicated in FIG. 3 a preferred form of waveguide structure 19 comprises a cylindrical fiber core 21 surrounded by concentric cladding layers 22, 25, the waveguide may alternatively be provided as shown in FIG. 4 by a core in the form of a thin plate 36, clad on both side surfaces with parallel cladding layers 37, 38 respectively corresponding to the layers 22, 25 of the structure of FIGS. 1 and 3. In the latter case, the thickness of the core plate 36 and the refractive indices of the core and cladding are selected so that light incident on an edge of the plate will propagate through the plate only in the lowest order mode; by way of example, a core plate thickness of 2 microns and core and cladding refractive indices respectively equal to 1.54 and 1.52 will provide this result for light of the exemplary wavelengths referred to above. For use in the heterodyne system of FIG. 1, the plate is positioned in the light path between the beam splitter 15 and the photomultiplier 16 so that a cylindrical form of lens system 20 focuses light onto an edge of the plate 36 for propagation therethrough.

As thus included in the system of FIG. 1, the thin plate waveguide of FIG. 4 provides mode selection (and consequent alignment of the two laser light beams) in a plane which contains the axis of the light propagation path and a perpendicular to the thin plate, but not in the plane which contains the thin plate. That is to say, the latter waveguide mode selects the light beams only in one of the two mutually perpendicular directions (normal to the oprpagation path axis) which lie respectively in these two planes, whereas the fiber structure of FIG. 3 mode selects the light beams in both such directions. Nevertheless, the plate waveguide of FIG. 4 is suitable for use for special applications in which alignment in only one of these directions is sufficient.

As will be appreciated from the foregoing description of the invention, one especially important and advantageous result of the present system, incorporating a mode-selective optical waveguide in the path of the light intermediate the beam splitter 15 and photomultiplier 16, is to permit light in only a single mode to pass to the photomultiplier and thus to ensure that all of the light of both incoming signal and local oscillator frequencies incident on the photomultiplier is effectively aligned with wavefronts in parallel relation. The light-aligning arrangement of the invention is particularly convenient in that the beams of light advancing from the beam splitter can be focused relatively easily onto the end of the fiber. Furthermore, if there is any misalignment of the axes of propagation of the incoming signal and local oscillator beams prior to their passage through the fiber, the amplitude of the produced difference-frequency output of the photomultiplier will be smaller than in the absence of misalignment (due to attenuation of the non-aligned portion of the light in the fiber) but this difference frequency signal will not be impaired by instantaneous averaging of misalignment-created phase-displaced light energies because none of the non-aligned light can reach the photomultiplier.

Although as stated above the waveguide structure 19 is conveniently or preferably adapted to propagate light only in the $HE_{11}$ mode, the foregoing advantages may also be attained with waveguides designed to support propagation in one or more higher-order modes at the incoming-signal and local signal frequencies. In such case, the waveguide (again arranged and disposed as shown in FIG. 1) may propagate the two light energies in a plurality of modes, as determined by the waveguide characteristics, the particular light frequencies, and the incident angle of the light on the waveguide end 23. However, light in each such mode emerges from the waveguide with a particular characteristic direction of propagation (for example, at a given angle to the waveguide axis); hence the photomultiplier may readily be arranged, by appropriate positioning relative to the waveguide and/or with suitable means such as the lens 27 employed to control passage of light from the waveguide to the photomultiplier, to receive light from the waveguide in only one selected mode. That is to say, the waveguide 19 acts as before to establish portions of both light energies in at least one common mode (for example, a higher order mode) which mode can then be selectively received and detected by the photomultiplier with the result that both energies reach the photomultiplier in the same mode and with parallel wavefronts, as desired.

Further, while the present system has been described above as used for photomixing of two coherent and monochromatic laser light emissions, the system also provides useful optical heterodyne detection even if one of the signals is incoherent broad-band light. The necessary conditions for heterodyne operation are that the local light signal have at least one frequency component differing in frequency from a frequency component of the incoming signal, and that one of the two signals is monochromatic (and preferably also coherent). Thus for example the system of FIG. 1, including the laser 12 providing a coherent and monochromatic local signal, may be used for detection of incoming white light. In such case, the radio-frequency or microwave-frequency output of the photomultiplier may be "white noise" rather than an output signal at a single difference frequency.

It is to be understood that the invention is not limited to the features and embodiments herein specifically set forth but may be carried out in other ways without departure from its spirit.

I claim:

1. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; means, including an optical waveguide positioned in said path and dimensioned and adapted to support propagation in at least one wave-energy propagation mode of light energy having said first-mentioned and second-mentioned frequency components, for receiving and propagating in said one mode both said light energies in said path to provide therefrom light energies exiting from said waveguide in a common mode with mutually parallel plane wavefronts; and means having a non-linear light-energy detection characteristic for deriving from light energy propagated by said waveguide in said one mode energy of a frequency equal to the difference between the frequencies of said first-mentioned and second-mentioned frequency components.

2. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; means, including an optical waveguide comprising an optical fiber positioned in said path and dimensioned and adapted to support propagation in at least one wave-energy propagation mode of light energy having said first-mentioned and second-mentioned frequency components, for receiving and propagating in said one mode both said light energies in said path to provide therefrom light energies exiting from said waveguide in a common mode with mutually parallel plane wave fronts; and means having a non-linear light-energy detection characteristic for deriving from light energy propagated by said waveguide in said one mode energy of a frequency equal to the difference between the frequencies of said first-mentioned and second-mentioned frequency components.

3. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; means, including an optical waveguide positioned in said path and comprising an optical fiber having a core of material of one index of refraction and a cladding of material of lesser index of refraction with waveguide parameters and core boundary conditions selected to support propagation in at least one wave-energy propagation mode of light energy having said first-mentioned and second-mentioned frequency components, for receiving and propagating in said one mode both said light energies in said path to provide therefrom light energies exiting from said waveguide in a common mode with mutually parallel plane wave fronts; and means having a non-linear light-energy detection characteristic for deriving from light energy propagated by said waveguide in said one mode energy of a frequency equal to the difference between the frequencies of said first-mentioned and second-mentioned frequency components.

4. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; means, including an optical waveguide positioned in said path and comprising a thin core plate of material of one index of refraction laterally clad with a material of lesser index of refraction and having waveguide parameters and core boundary conditions selected to support propagation in at least one wave-energy propagation mode of light energy having said first-mentioned and second-mentioned frequency components, for receiving and propagating in said one mode both said light energies in said path to provide therefrom light energies exiting from said waveguide in a common mode with mutually parallel plane wave fronts; and means having a non-linear light-energy detection characteristic for deriving from light energy propagated by said waveguide in said one mode energy of a frequency equal to the difference between the frequencies of said first-mentioned and second-mentioned frequency components.

5. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; means, including an optical waveguide positioned in said path and comprising an elongated body of light-transmissive material with a transverse dimension and propagation boundary conditions selected to support longitudinal propagation in said body in at least one wave-energy propagation mode of light energy having said first-mentioned and second-mentioned frequency components, for receiving and propagating in said one mode both said light energies in said path to provide therefrom light energies exiting from said wave guide in a common mode with mutually parallel plane wave fronts; and means having a non-linear light-energy detection characteristic for deriving from light energy propagated by said waveguide in said one mode energy of a frequency equal to the difference between the frequencies of said first-mentioned and second-mentioned frequency components.

6. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; an optical waveguide positioned in said path and comprising an elongated body of light-transmissive material with a transverse dimension and propagation boundary conditions selected to support longitudinal propagation through said body in at least one wave-energy propagation mode of light energy having said first-mentioned and second-mentioned frequency components; means for directing both said light energies in said path into said waveguide for propagation of both said energies longitudinally through said waveguide in at least said one mode to provide therefrom light energies exiting from said waveguide in a common mode with mutually parallel plane wave fronts; and means having a non-linear light energy detection characteristic for deriving from light energy propagated through said waveguide in said one mode energy of a frequency equal to the difference between the frequencies of said first-mentioned and second-mentioned frequency components.

7. An optical system for detecting light energy having at least one frequency component and advancing along a propagation path, comprising means for creating and directing along said path light energy having at least one frequency component differing in frequency from that of said first-mentioned frequency component, at least one of said light energies being monochromatic; means, including an optical waveguide positioned in said path and dimensioned and adapted to support propagation in the lowest-order wave-energy propagation mode of light energy having said first-mentioned and second-mentioned frequency components and to attenuate all higher-order modes, for receiving and propagating in said lowest-order mode both said light energies in said path to provide therefrom light energies exiting from said waveguide in a common mode with mutually parallel plane wave fronts; and means having a non-linear right-energy detection characteristic for deriving from light energy propagated by said waveguide in said lowest-order mode energy of a frequency equal to the difference between the frequencies of said first-mentioned and second-mentioned frequency components.

8. An optical system for detecting light energy having at least one frequency component and advancing along a propagation path, comprising means for creating and directing along said path monochromatic light energy having a frequency component differing in frequency from that of said first-mentioned frequency component; means, including an optical waveguide positioned in said path and dimensioned and adapted to support propagation in the lowest-order wave-energy propagation mode of light energy having said first-mentioned and second-mentioned frequency components and to attenuate all higher-order modes, for receiving and propagating in said lowest-order mode both said light energies in said path to provide therefrom light energies exiting from said waveguide in a common mode with mutually parallel plane wave fronts; and photo-detecting means, positioned to intercept light energy propagated by said waveguide in said lowest-order mode and having a non-linear light energy detection characteristic, for producing in response to excitation by light energy propagated by said waveguide in said lowest-order mode an electrical energy output including a component having a frequency equal to the difference between the frequencies of said first-mentioned and second-mentioned frequency components.

9. An optical system for detecting light energy having at least one frequency component and advancing along a propagation path, comprising means for creating and directing along said path coherent, monochromatic light energy having a frequency component differing in frequency from that of said first-mentioned frequency component; an optical waveguide positioned in said path and comprising an elongated body of light-transmissive material having a transverse dimension and propagation boundary conditions selected to support longitudinal propagation through said body in the lowest-order wave-energy propagation mode of light energy having said first-mentioned and second-mentioned frequency components and to attenuate all higher-order modes; means for directing both said light energies in said path into said waveguide for propagation of both said energies longitudinally through said waveguide in said lowest-order mode to provide therefrom light energies exiting from said waveguide in a common mode with mutually parallel plane wave fronts; and photo-detecting means, positioned to intercept light energy propagated through said waveguide in said lowest-order mode and having a non-linear light-energy detection characteristic, for producing in response to excitation by light energy propagated through said waveguide in said lowest-order mode an electrical energy output including a component having a frequency equal to the difference between the frequencies of said first-mentioned and second-mentioned frequency components.

10. An optical system for detecting coherent, monochromatic light energy of a first, preselected frequency advancing along a propagation path, comprising means for creating and directing along said path coherent, monochromatic light energy of a second frequency differing from said first frequency by a preselected frequency difference; an optical waveguide positioned in said path and comprising an elongated core body of one index of refraction clad with a material of lesser index of refraction and having a transverse core dimension and core boundary conditions selected to support longitudinal propagation through said core body in the lowest-order wave-energy propagation mode of light energy of said first and second frequencies and to attenuate all higher-order modes; means for directing both said light energies in said path into one end of said waveguide core body for propagation of both said energies longitudinally through said core body in said lowest-order mode to provide therefrom light energies exiting from said waveguide in a common mode with mutually parallel plane wave fronts; and photo-detecting means, positioned to intercept light energy propagated through said waveguide in said lowest-order mode and having a non-linear light-energy detection characteristic, for producing in response to excitation by said light energy propagated through said waveguide in said lowest-order mode an electrical energy output including a component having a frequency equal to said preselected frequency difference.

11. An optical system for detecting coherent, monochromatic laser light energy of a first, preselected frequency advancing along an axis of propagation, comprising laser means for emitting along an axis of propagation intersecting said first-mentioned axis at a predetermined point coherent, monochromatic light energy of a second frequency differing from said first frequency by a preselected frequency difference; means positioned at said predetermined point for aligning at least a portion of both said light energies along a single propagation path; an optical fiber positioned in said path and comprising an elongated fiber core body of material of one index of refraction clad with a material of lesser index of refraction and having a transverse core dimension and core boundary conditions selected to support longitudinal propagation through said core body in the lowest-order-wave-energy propagation mode of light energy of said first and second frequencies and to attenuate all higher-order modes; means for directing both said light energies in said path into one end of said fiber core body for propagation of both said energies longitudinally through said core body in said lowest-order mode to provide therefrom light energies exiting from said fiber in a common mode with mutually parallel plane wave fronts; and photo-detecting means, positioned to intercept light energies propagated through said fiber in said lowest-order mode and having a non-linear light-energy detection characteristic, for producing in response to excitation by light energy propagated through said fiber in said lowest-order mode an electrical energy output including a component having a frequency equal to said preselected frequency difference.

12. An optical system for detecting a continuous emission of coherent, monochromatic laser light energy of a first, preselected frequency advancing along an axis of propagation, comprising a gas discharge laser adapted to emit along an axis of propagation substantially perpendicularly intersecting said first-mentioned axis at a predetermined point a continuous output of coherent, monochromatic laser light energy having a frequency differing from said first frequency by a preselected frequency difference of not higher than microwave-frequency magnitude; beam-splitter means positioned at said predetermined point for transmitting a portion of said first-mentioned light energy along a propagation path coaxial with said first-mentioned axis and reflectively aligning a portion of said second-mentioned light energy along said path; an optical fiber positioned in said path and comprising an elongated fiber core body of material of one index of refraction clad with a material of lesser index of refraction and having a transverse core dimension and core boundary conditions selected to support longitudinal propagation through said core body in the lowest-order wave-energy propagation mode of light energy of said first and second frequencies and to attenuate all higher-order propagation modes; reversed-microscope-objective lens means positioned in said path and adapted to direct both said light energies in said path into one end of said fiber core body for propagation of both said energies longitudinally through said core body in said lowest-order mode to provide therefrom light energies exiting from said fiber in a common mode with mutually parallel plane wave fronts; photomultiplier means, positioned to intercept light energy propagated through said fiber in said lowest-order mode and having a nonlinear light energy detection characteristic for producing in response to excitation by light energy propagated through said fiber in said lowest-order mode an electrical energy output including a component having a frequency equal to said preselected frequency difference; and band-pass filter means connected as the output circuit of said photomultiplier means for selectively transmitting said component of said electrical energy output.

No references cited.

ROY LAKE, *Primary Examiner.*

D. R. HOSTETTER, *Assistant Examiner.*

UNITED STATES PATENT OFFICE
CERTIFICATE OF CORRECTION

Patent No. 3,350,654            October 31, 1967

Elias Snitzer

It is hereby certified that error appears in the above numbered patent requiring correction and that the said Letters Patent should read as corrected below.

Column 1, line 60, for "frequently" read -- frequency --; column 3, line 14, for "wich" read -- which --; line 27, strike out "or path of propagation of the incoming beam to-", and insert instead -- perpendicular to the latter beam. At the point of --; column 5, line 37, for "beams" read -- beam --.

Signed and sealed this 15th day of April 1969.

(SEAL)
Attest:

Edward M. Fletcher, Jr.

Attesting Officer

EDWARD J. BRENNER

Commissioner of Patents

UNITED STATES PATENT OFFICE
CERTIFICATE OF CORRECTION

Patent No. 3,350,654                          October 31, 1967

Elias Snitzer

It is hereby certified that error appears in the above numbered patent requiring correction and that the said Letters Patent should read as corrected below.

Column 1, line 60, for "frequently" read -- frequency --; column 3, line 14, for "wich" read -- which --; line 27, strike out "or path of propagation of the incoming beam to-", and insert instead -- perpendicular to the latter beam. At the point of --; column 5, line 37, for "beams" read -- beam --.

Signed and sealed this 15th day of April 1969.

(SEAL)
Attest:

Edward M. Fletcher, Jr.
Attesting Officer

EDWARD J. BRENNER
Commissioner of Patents